United States Patent
Tokunaga et al.

(10) Patent No.: US 6,175,296 B1
(45) Date of Patent: *Jan. 16, 2001

(54) POTENTIOMETER PROVIDED WITH GIANT MAGNETORESISTIVE EFFECT ELEMENTS

(75) Inventors: Ichirou Tokunaga; Seiji Kikuchi, both of Miyagi-ken; Yoshito Sasaki; Takashi Hatanai, both of Niigata-ken, all of (JP)

(73) Assignee: Alps Electric Co., Ltd. (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/353,293

(22) Filed: Jul. 12, 1999

(30) Foreign Application Priority Data

Jul. 17, 1998 (JP) .................................. 10-204067

(51) Int. Cl.[7] .................................. H01L 43/00
(52) U.S. Cl. .................. 338/32 R; 338/12; 324/207.21
(58) Field of Search ............................ 338/68, 89, 118, 338/196, 12, 32 R, 32 H; 360/113; 324/207.21

(56) References Cited

U.S. PATENT DOCUMENTS

| | | | |
|---|---|---|---|
| 3,745,503 | * 7/1973 | Kobayashi | 338/12 |
| 3,777,273 | * 12/1973 | Baba et al. | 324/207.21 |
| 4,125,821 | * 11/1978 | Masuda | 338/32 R |
| 4,132,970 | * 1/1979 | Masuda et al. | 338/32 R |
| 4,425,557 | * 1/1984 | Nakamura | 338/32 H |
| 4,480,248 | * 10/1984 | Sudo et al. | 338/32 R |
| 5,055,781 | * 10/1991 | Sakakibara et al. | 324/207.21 |
| 5,231,508 | * 7/1993 | Murphy, Jr. | 338/32 H |
| 5,561,368 | 10/1996 | Dovek et al. . | |
| 5,650,721 | * 7/1997 | van den Berg et al. | 338/22 R |
| 5,686,837 | 11/1997 | Coehoorn et al. . | |
| 5,796,249 | * 8/1998 | Andraet et al. | 324/207.21 |

FOREIGN PATENT DOCUMENTS

| | | |
|---|---|---|
| 195 20 206 A1 | 12/1996 | (DE) . |
| 195 48 385 A1 | 7/1997 | (DE) . |
| 198 10 838 A1 | 9/1999 | (DE) . |

* cited by examiner

*Primary Examiner*—Karl D. Easthom
(74) *Attorney, Agent, or Firm*—Brinks Hofer Gilson & Lione

(57) ABSTRACT

The potentiometer of the present invention includes at least a pair of giant magnetoresistive effect elements, in which the giant magnetoresistive effect elements to be paired are formed on a substrate in a state that the elements are connected mutually electrically with the orientations of magnetization axes of the pinned magnetic layers facing 180° opposite each other, and a magnetic coding member is rotatably provided to face the giant magnetoresistive effect elements on the substrate, the magnetic coding member is disposed in such a manner that the center of rotation of the magnetic coding member passes through an intermediate position of the giant magnetoresistive effect elements to be paired, and the magnetic coding member has at least two magnetic poles formed along the direction of rotation of itself.

4 Claims, 13 Drawing Sheets

POTENTIOMETER PROVIDED WITH GIANT MAGNETORESISTIVE EFFECT ELEMENTS

BACKGROUND OF THE INVENTION

1. Field of the Invention

The present invention relates to a potentiometer provided with giant magnetoresistive effect elements that demonstrate very large resistance variations in response to the variation of external magnetic fields.

2. Related Art

A magnetic field sensor using giant magnetoresistive effect elements is disclosed in, for example, the Japanese Published Unexamined Patent Application No. Hei 8-226960, in which four giant magnetoresistive effect elements are electrically connected in a bridge circuit.

As shown in FIG. 17, a magnetic field sensor A disclosed in this application comprises separately located giant magnetoresistive effect elements 1, 2, 3, 4, in which the giant magnetoresistive effect elements 1, 2 are connected by a lead 5, the giant magnetoresistive effect elements 1, 3 are connected by a lead 6, the giant magnetoresistive effect elements 3, 4 are connected by a lead 7, the giant magnetoresistive effect elements 2, 4 are connected by a lead 8, an input terminal 10 is connected to the lead 6, an input terminal 11 is connected to the lead 8, an output terminal 12 is connected to the lead 5, and an output terminal 13 is connected to the lead 7.

And, the giant magnetoresistive effect elements 1, 2, 3, 4 each assume a sandwich structure in which a non-magnetic layer 15 is interpolated between an upper and a lower ferromagnetic layers 16, 17, and an anti-ferromagnetic exchange bias layer 18 is formed on the ferromagnetic layer (pinned magnetic layer) 16, whereby the exchange coupling generated by this exchange bias layer 18 pins the magnetization axis of the ferromagnetic layer 16 in one direction. Further, the orientation of magnetization axis of the ferromagnetic layer (free magnetic layer) 17 on the other side is made to freely rotate in accordance with the orientation of the external magnetic field; for example, it is made to freely rotate on the horizontal plane including the ferromagnetic layer 17.

Further, in the magnetic field sensor A having the structure shown in FIG. 17, the orientation of magnetization axis of the pinned magnetic layer 16 of the giant magnetoresistive effect element 1 faces forward as shown by the arrow 20 in FIG. 17, the orientation of magnetization axis of the pinned ferromagnetic layer 16 of the giant magnetoresistive effect element 2 faces backward as shown by the arrow 21, the orientation of magnetization axis of the pinned magnetic layer 16 of the giant magnetoresistive effect element 3 faces backward as shown by the arrow 23, and the orientation of magnetization axis of the pinned magnetic layer 16 of the giant magnetoresistive effect element 4 faces forward. And, the orientation of magnetization axis of the free magnetic layer 17 of each of the giant magnetoresistive effect elements 1, 2, 3, 4 faces to the right as shown by the arrow 24 in FIG. 17, in the state that the external magnetic field is not exerted.

In the magnetic field sensor A shown in FIG. 17, when an external magnetic field H is exerted, in the first and fourth giant magnetoresistive effect elements 1, 4, for example, the magnetization axis 24 of the free magnetic layer 17 rotates by a specific angle d as shown in FIG. 18, in accordance with the external magnetic field H; accordingly, the relation of angle to the magnetization axis 20 of the pinned magnetic layer 16 varies to effect a resistance variation. And, since the orientations of magnetization axes of the pinned magnetic layers 16 of the first and fourth giant magnetoresistive effect elements 1, 4 face opposite with the difference of 180° to the orientations of magnetization axes of the pinned magnetic layers 16 of the second and third giant magnetoresistive effect elements 2, 3, the resistance variation involving a phase difference can be acquired.

In the magnetic field sensor A electrically connected in a bridge circuit shown in FIG. 17, the orientations of magnetization axes are specified as shown by each of the arrows, since the differential output has to be obtained from the giant magnetoresistive effect elements 1, 2, 3, 4 when the magnetization orientations of the free magnetic layers 17 vary in response to the external magnetic field H, and in the giant magnetoresistive effect elements 1, 2, 3, 4 located right and left, upper and lower in FIG. 17, the magnetization axes are needed to be pinned in antiparallel directions such that any of two adjacent elements are magnetized in the opposite directions with 180°.

In order to achieve the structure shown in FIG. 17, it is imperative to form the giant magnetoresistive effect elements 1, 2, 3, 4 adjacently on a substrate, and fix the orientations of magnetization axes of the pinned magnetic layers 16 of any adjacent two of giant magnetoresistive effect elements opposite each other with the difference of 180°.

Further, in order to control the magnetization orientations of the pinned magnetic layers 16 of this type, and adjust the lattice magnetization of the exchange bias layer 18, it is imperative to apply a magnetic field of a specific direction to the exchange bias layer 18 while it is heated at a higher temperature than the so-called blocking temperature at which the ferromagnetism disappears, and in addition to conduct a heat treatment to cool while this magnetic field is maintained under application.

However, in the structure shown in FIG. 17, since the magnetization orientations of the exchange bias layers 18 must be shifted by 180° to one another for any two of the giant magnetoresistive effect elements 1, 2, 3, 4, the directions of the magnetic fields must be controlled individually for each of the giant magnetoresistive effect elements adjacently formed on a substrate. Since the method of applying a magnetic field simply from outside by using the magnetic field generator such as an electromagnet or the like allows application of the magnetic field only in one direction, it is very difficult to fabricate the structure shown in FIG. 17, which is a problem.

The technique disclosed in the Japanese Published Unexamined Patent Application No. Hei 8-226960 indicates that the structure shown in FIG. 17 can be achieved by depositing conductive layers individually along each of the giant magnetoresistive effect elements 1, 2, 3, 4 adjacently formed on a substrate, flowing currents in each of these conductive layers in different directions to individually generate magnetic fields of different directions from each of the conductive layers, and conducting the foregoing heat treatment. However, even if it is desired to generate high magnetic fields by applying high currents to the conductive films in order to control the lattice magnetization of the exchange bias layers 18, it is difficult to flow high currents through the thin conductive films that are deposited with the giant magnetoresistive effect elements on the substrate, and difficult to generate the magnetic fields from the conductive films, which are sufficient for the subsequent processes.

Further, since the magnetic fields are exerted on the giant magnetoresistive effect elements 1, 2, 3, 4 adjacently formed on a substrate, in each different directions from a plurality of the conductive films, it is extremely difficult to individually apply the high magnetic fields to each of the exchange bias layers 18 of the giant magnetoresistive effect elements 1, 2, 3, 4.

As mentioned above, the magnetic field sensor A shown in FIG. 17 possesses an excellent function as a magnetic sensor; however in reality, to form the films on a substrate and fabricate the magnetic field sensor A involves extremely delicate processes to apply the magnetic fields and heat processes, making the fabrication difficult, and the structure causes a problem for wider applications.

Further, as to the applications of the magnetic field sensor A shown in FIG. 17, the Japanese Published Unexamined Patent Application No. Hei 8-226960 only suggests the applications to linear and rotary encoders, proximity sensors, geomagnetic magnetometers, and the like. And, there are not any concrete suggestions as to which equipment and fields the structure of the magnetic field sensor A is to be applied to.

On the other hand, as an example of products applying the magnetism, a magnetic potentiometer using the Hall elements is well known. The potentiometer of this type uses the Hall elements responsive to the variations of the magnetic field as the detecting elements, however the signal output obtained from the Hall elements of this type is extremely low; accordingly, a new structure has been expected which can produce a higher signal output.

SUMMARY OF THE INVENTION

In view of the foregoing circumstances, the present invention has been made through trials to employ the giant magnetoresistive effect elements, which is based on a novel idea unlike the conventional magnetic field sensor. It is therefore an object of the present invention to provide a potentiometer that detects the angle of rotation of a magnetic coding member and obtains a higher output by adopting a unique structure using the giant magnetoresistive effect elements.

Another object of the present invention is to provide a potentiometer that securely controls the orientations of magnetization axes of the exchange bias layers of four giant magnetoresistive effect elements individually in preferable directions, and facilitates fabrication by adopting a structure that makes the control easy.

In order to accomplish the foregoing objects, the potentiometer of the present invention comprises at least a pair of giant magnetoresistive effect elements that contain at least exchange bias layers, pinned magnetic layers whose orientations of magnetization axes are fixed in one direction by the exchange bias layers, non-magnetic layers, and free magnetic layers whose orientations of magnetization axes are freely rotated by an external magnetic field. And, the giant magnetoresistive effect elements to be paired are formed on a substrate in a state that the elements are connected mutually electrically with the orientations of magnetization axes of the pinned magnetic layers facing 180° opposite each other, and a magnetic coding member is rotatably provided to face the giant magnetoresistive effect elements on the substrate, the magnetic coding member is disposed in such a manner that the center of rotation of the magnetic coding member passes through an intermediate position of the giant magnetoresistive effect elements to be paired, and the magnetic coding member has at least two magnetic poles formed along the direction of rotation of itself.

The potentiometer of the present invention may take on a construction such that the foregoing giant magnetoresistive effect elements to be paired are formed on the substrate to be mutually detached, and the center position of these giant magnetoresistive effect elements coincides with the central axis position of rotation of the magnetic coding member.

The potentiometer of the present invention may take on another construction such that in the foregoing giant magnetoresistive effect elements, a first giant magnetoresistive effect element and a second giant magnetoresistive effect element are disposed along a first straight line, a third giant magnetoresistive effect element and a fourth giant magnetoresistive effect element are disposed along a second straight line parallel to the first straight line, and the center position of these four giant magnetoresistive effect elements coincides with the central axis position of rotation of the magnetic coding member.

The potentiometer of the present invention may take on another construction such that a Wheatstone bridge is formed by electrically connecting those of the first, second, third, and fourth giant magnetoresistive effect elements, which contain the pinned magnetic layers having different orientations of magnetization axes.

Further, the potentiometer of the present invention may take on another construction such that input terminals are formed on two of connecting points among the first, second, third, and fourth giant magnetoresistive effect elements, and output terminals are formed on the remaining two of them.

BRIEF DESCRIPTION OF THE DRAWINGS

FIG. 8 is formed on a substrate;

DESCRIPTION OF THE PREFERRED EMBODIMENTS

The first embodiment of a potentiometer of the present invention will be described with reference to the accompanying drawings.

Figure 1:
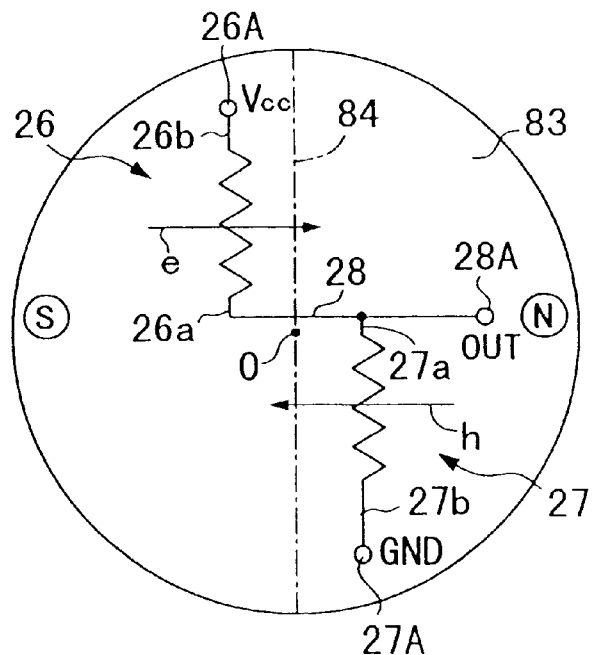
FIG. 1 is a circuit diagram to illustrate a connection structure of the giant magnetoresistive effect elements provided in the potentiometer relating to the present invention.
Figure 2:
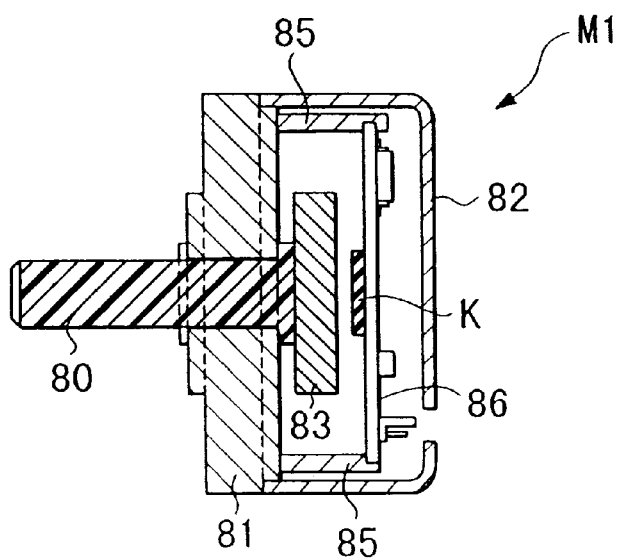
FIG. 2 is a sectional view of the potentiometer relating to the first embodiment, incorporating a substrate on which the giant magnetoresistive effect elements shown in FIG. 1 are formed.

FIG. 1 illustrates a connection of the giant magnetoresistive effect elements provided in the potentiometer of the first embodiment, and a circuit diagram of the configuration of a magnetic coding member that faces them, and FIG. 2 illustrates a sectional structure of the potentiometer of the first embodiment.

In the circuit shown in FIG. 1, ends 26a, 27a of the giant magnetoresistive effect elements 26, 27 that vary electric resistances in response to an external magnetic field are connected by a conductor 28, an output terminal 28A is formed on the conductor 28 of the connected area, an input terminal 26A is formed on the other end 26b of the giant magnetoresistive effect element 26, a ground terminal 27A is formed on the other end 27b of the giant magnetoresistive effect element 27. In other words, the circuit structure shown in FIG. 1 is comprised of an intermediate point of connecting the giant magnetoresistive effect elements 26, 27 in series, the output terminal on one end, and the input terminal on the other end.

In practice, the circuit shown in FIG. 1 is formed on one plane of a substrate K incorporated into a potentiometer M1 shown in FIG. 2, the giant magnetoresistive effect element 26 and the giant magnetoresistive effect element 27 are disposed in parallel with a specific distance detached, and the one end 26a of the giant magnetoresistive effect element 26 and the other end 27a of the giant magnetoresistive effect element 27 are placed close to each other at alternate positions, the orientations e, h of magnetization axes of the pinned magnetic layers described later which are formed on the giant magnetoresistive effect elements 26, 27 are set with the difference of 180° each other.

The potentiometer M1 shown in FIG. 2 is composed of a rotary spindle 80, a disk bearing member 81 that supports this rotary spindle 80 about the axis to freely rotate, a cap-shape covering member 82 mounted on the rear of this bearing member 81, a magnetic coding member 83 installed on the rear of the bearing member 81 which is covered with this covering member 82, and a substrate K. The bearing member 81 is formed of, for example, a brass disk member, and the covering member 82 is formed by drawing, for example, a metal plate.

The rotary spindle 80 is made of a non-magnetic material such as a resin or non-magnetic stainless steel, a part of one end of the rotary spindle 80 is thrust through the bearing member 81 to project out on the rear side, and on the one end, the magnetic coding member 83 is attached perpendicularly to the rotary spindle 80. The magnetic coding member 83 is a magnet such that one side (left in FIG. 1) is magnetized to S pole and the other side (right in FIG. 1) to N pole, regarding one center line 84 passing a central axis O of one plane of the magnetic coding member 83 as the boundary.

Therefore, the magnetic coding member 83 has a plurality of magnetic poles formed along the circumference thereof. Since the magnetic coding member 83 needs to have two or more magnetic poles formed along the circumference, it is not necessary to have only two magnetic poles (S pole and N pole) as in this embodiment. And, the rotary spindle 80 may be made of a soft magnetic substance such as iron, or a ferromagnetic substance if it is sufficiently detached from the magnetic coding member 83 and the giant magnetoresistive effect elements 26, 27.

A mounting board 86 is attached with a gap in parallel to the magnetic coding member 83, which is supported by a holder member 85 on the rear side of the bearing member 81. The substrate K is mounted on the center of the mounting board 86 facing to the magnetic coding member 83. On one side of the substrate K, the giant magnetoresistive effect elements 26, 27 shown in FIG. 1 are formed, and they are fixed on the mounting board 86 in such a manner that the center line 84 of the magnetic coding member 83 is located at the intermediate part of the giant magnetoresistive effect elements 26, 27 facing to the magnetic coding member 83. Further, as shown in FIG. 1, when the center line 84 of the magnetic coding member 83 is made to face to such a direction that the center line 84 coincides with the central line of the giant magnetoresistive effect elements 26, 27, it is most preferable that the giant magnetoresistive effect elements 26, 27 are disposed so as to come to the location of point symmetry, regarding the central axis O of the magnetic coding member 83 as the base point.

And, the distance between the magnetic coding member 83 and the substrate K is specified as a distance for use in an area where the giant magnetoresistive effect elements 26, 27 reach the magnetic saturation point by a magnetic field that the magnetic coding member 83 generates, normally the distance is about several mm to a little more than ten mm.

Figure 3:
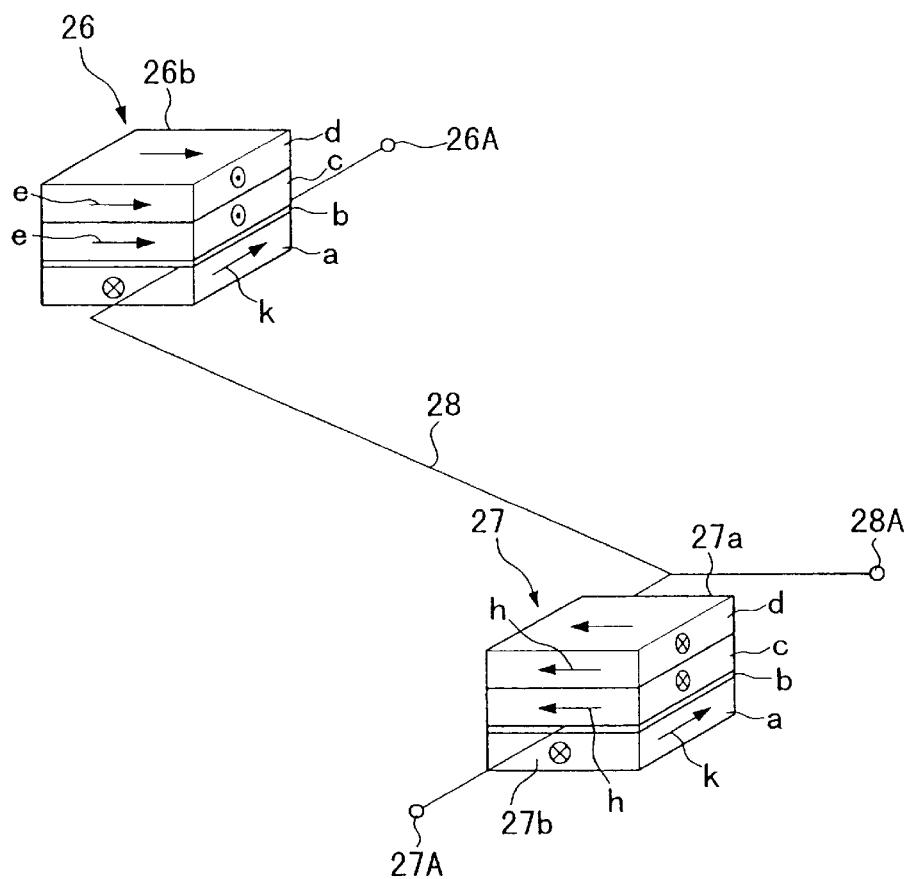
FIG. 3 is a constructional chart to illustrate the basic structure and connection of the giant magnetoresistive effect elements shown in FIG. 1.

FIG. 3 clarifies a concrete lamination structure of the giant magnetoresistive effect elements 26, 27 of this embodiment, and the orientations of magnetization axes of these layers, in which the giant magnetoresistive effect elements 26, 27 each are made equal in terms of structure, and each of them comprises a ferromagnetic layer (free magnetic layer) a, non-magnetic layer b, ferromagnetic layer (pinned magnetic layer) c, and exchange bias layer (anti-ferromagnetic layer) d which are deposited in lamination, basically as shown in FIG. 3. And, the giant magnetoresistive effect elements 26, 27 are preferably formed to be linearly slender in the plan view. Therefore, in case of the connection circuit shown in FIG. 1, in the state that the giant magnetoresistive effect elements 26, 27 are abbreviated by the circuit symbol of a wave line, it is preferable to dispose the linear giant magnetoresistive effect elements 26, 27 along the longitudinal direction of the wave line (the vertical direction in FIG. 1, or the direction parallel to the center line 84).

In the lamination structure shown in FIG. 3, the pinned magnetic layers c adjacent to the exchange bias layers d are pinned in terms of the orientations of magnetization axes by the exchange bias layers d. Concretely, in the giant magnetoresistive effect element 26, the orientations of magnetization axes of the exchange bias layer d and the pinned magnetic layer c are set to the right as shown by the arrow e; and in the giant magnetoresistive effect element 27, the orientations of magnetization axes of the exchange bias layer d and the pinned magnetic layer c are set to the left as shown by the arrow h. Accordingly, the orientations of magnetization axes of the pinned magnetic layers c of the giant magnetoresistive effect elements 26, 27 face 180° opposite each other.

Figure 4:
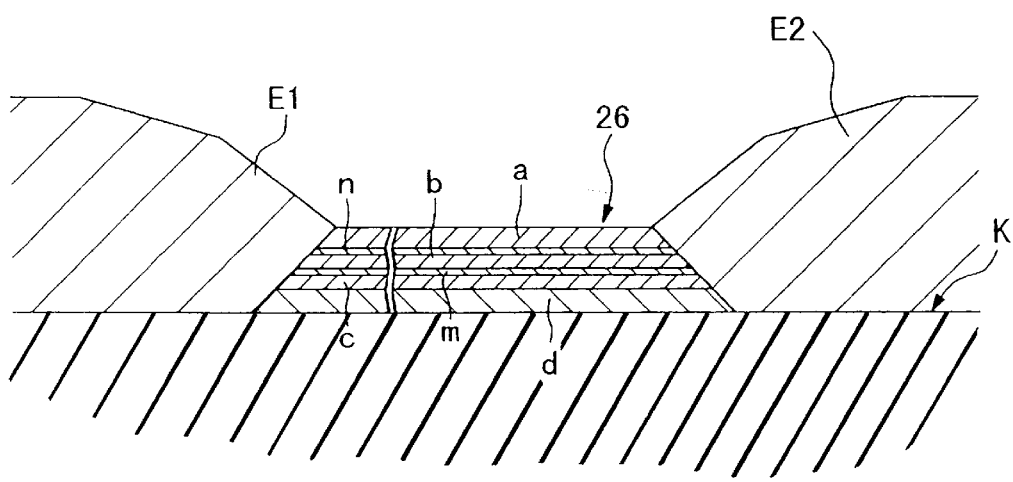
FIG. 4 is a sectional view to illustrate the lamination structure and connection parts in the giant magnetoresistive effect element applied to the potentiometer of which basic structure is shown in FIG. 3.

FIG. 4 illustrates an example of a detailed structure in which the layers are individually deposited on the substrate K to form the giant magnetoresistive effect element 26.

The giant magnetoresistive effect element 26 in this example is formed in an equal leg trapezoid, in which the exchange bias layer (anti-ferromagnetic layer) d, pinned magnetic layer c, sub-ferromagnetic layer m, non-magnetic layer b, sub-ferromagnetic layer n, and free magnetic layer a are deposited in lamination in this order from the bottom on the substrate K. On both sides of these laminates, conductors E1, E2 are formed so as to come in contact with these layers. These conductors E1, E2 are the conductors that electrically connect the giant magnetoresistive effect elements with each other. Incidentally, in the sectional structure shown in FIG. 4, a bias layer to transform the free magnetic layer a into a single magnetic domain may be formed appropriately in the connection area between the ends of the laminates and the conductors E1, E2.

In the structure in FIG. 4, the sub-ferromagnetic layers m and n are provided in order to effectively demonstrate the magnetoresistive effect, which are formed of ferromagnetic substances such as Co, Co alloy, or the like; however, these sub-ferromagnetic layers may be omitted. Further, the exchange bias layer d, pinned magnetic layer c, sub-ferromagnetic layer m, non-magnetic layer b, sub-ferromagnetic layer n, and free magnetic layer a may be deposited in lamination in the order opposite to this example.

Further, a more concrete lamination structure of the giant magnetoresistive effect element comprises, for example, $\alpha$-$Fe_2O_3$ layer (exchange bias layer)/NiFe layer (pinned magnetic layer)/Co layer (sub-ferromagnetic layer)/Cu layer (non-magnetic layer)/Co layer (sub-ferromagnetic layer)/NiFe layer (free magnetic layer). And, an $Al_2O_3$ layer as a current shunting layer may be formed under the $\alpha$-$Fe_2O_3$ layer as needed. In addition to the foregoing structures, a giant magnetoresistive effect element having a lamination structure of $\alpha$-$Fe_2O_3$ layer/Co layer/Cu layer/Co layer/NiFe layer/Co layer/Cu layer/Co layer/$\alpha$-$Fe_2O_3$ layer can be cited. Further, the exchange bias layer may use any of well-known ones as long as the orientation of magnetization axis of the pinned magnetic layer adjacent to the exchange bias layer can be pinned; and FeMn layer, NiMn layer, NiO layer, IrMn layer, CrPtMn layer, PdPtMn layer, MnRhRu layer, and PtMn layer, etc., may be used in addition to the $\alpha$-$Fe_2O_3$ layer.

In the potentiometer M1 having the structure shown in FIG. 1 through FIG. 4, when the rotary spindle 80 is rotated and a voltage is applied to the circuit from the input terminal 26A, if a voltage between the output terminal 28A and the ground terminal 27A is measured, then the electric resistance of a pair of the giant magnetoresistive effect elements 26, 27 varies by the action of the magnetic field, and the voltage variation of the middle point generated in accordance with the resistance variation can be measured. And, since this voltage variation draws a sine wave in accordance with the rotation angle of the rotary spindle 80, the rotation angle of the rotary spindle 80 can be detected in reverse from this sine wave, and the voltage variation can be used for the potentiometer.

Further, since the structure uses the giant magnetoresistive effect elements 26, 27, the potentiometer can use a large variation of resistance for detection; in consequence, it can obtain a high output of the sine wave.

Further, as shown in FIG. 1, if the intermediate position between the giant magnetoresistive effect elements 26, 27 is aligned to the position of the central axis O of the magnetic coding member 83 to thereby form the potentiometer M1, since the sine wave output obtained can be expected as a sine wave output that is constant and regulated in terms of the amplitude and frequency, the output signal analysis can be made precisely with ease.

Figure 5A:
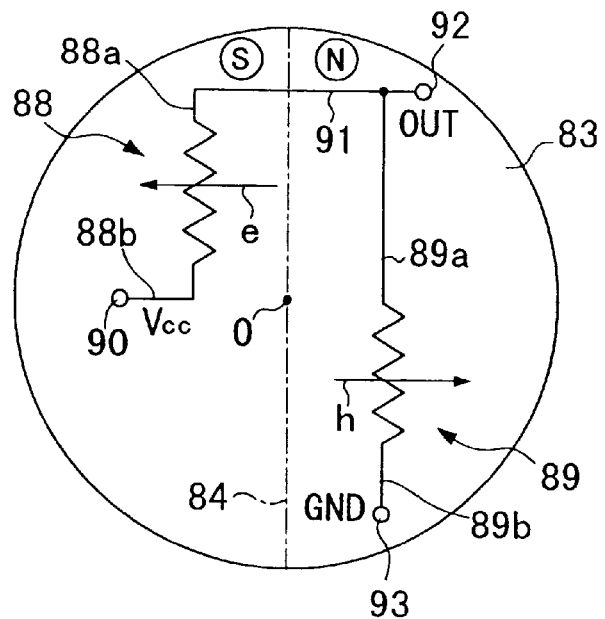
FIG. 5A is a circuit diagram to illustrate the second example of the connection structure of the giant magnetoresistive effect elements provided in the potentiometer relating to the present invention.

FIG. 5A illustrates the circuit configuration of giant magnetoresistive effect elements used for the potentiometer of the second embodiment. In this circuit configuration, the giant magnetoresistive effect elements 88, 89 are formed on the substrate K shown in FIG. 2 in the same manner as the first embodiment; however, the configuration of these elements is different in part.

An input terminal 90 is connected to one end 88b of the giant magnetoresistive effect element 88, to the other end 88a thereof is connected one end 89a of the giant magnetoresistive effect element 89 through a conductor 91, an output terminal 92 is connected to the conductor 91, and a ground terminal 93 is connected to the other end 89b of the giant magnetoresistive effect element 89. In this example, the giant magnetoresistive effect elements 88, 89 are disposed on the substrate K in a shape resembling the numeral 7 through the conductor 91.

And, since the orientation of magnetization axis of the pinned magnetic layer c of the giant magnetoresistive effect element 88 faces left in FIG. 5A, and the orientation of magnetization axis of the pinned magnetic layer c of the giant magnetoresistive effect element 89 faces right in FIG. 5A, the orientations of magnetization axes of the giant magnetoresistive effect elements 88, 89 face opposite to those of the giant magnetoresistive effect elements 26, 27 in the first embodiment. However, since the orientations of magnetization axes of the pinned magnetic layers c of the giant magnetoresistive effect elements 88, 89 to be paired face 180° opposite, which is the same, this configuration will obtain a sine wave output as a potentiometer in accordance with the rotation of the rotary spindle 80, in the same manner as the first embodiment.

Thus, the circuit configuration shown in FIG. 5A will also produce the effect as a potentiometer in the same manner as the first embodiment.

Figure 5B:
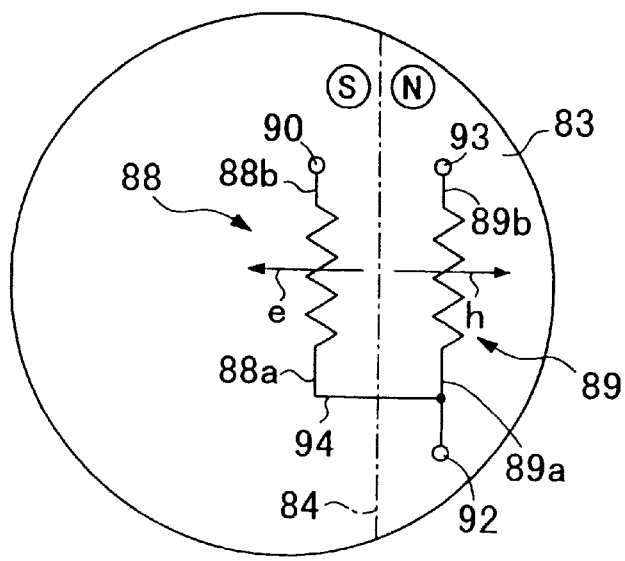
FIG. 5B is a circuit diagram to illustrate a modified example of the second example.

Further, FIG. 5B illustrates a modified example of the circuit shown in FIG. 5A. As shown in FIG. 5B, the giant magnetoresistive effect elements 88, 89 are formed on a position facing each other, one end 88a of the giant magnetoresistive effect element 88 is connected to one end 89a of the giant magnetoresistive effect element 89 through a conductor 94, the output terminal 92 is formed on the conductor 94, the terminal 90 is formed on the other end of the giant magnetoresistive effect element 88, and the terminal 93 is formed on the other end of the giant magnetoresistive effect element 89. As shown in this example, the giant magnetoresistive effect elements 88, 89 may be configured in a shape resembling the letter U.

Further, instead of configuring the magnetic poles on both sides of the center of the magnetic coding member 83, this construction may adopt a structure that configures the N pole and S pole regarding a chord 840 of the disc-like face of the magnetic coding member 83 as the boundary. In this case, the cord 840 shown in FIG. 5B being the boundary of both the poles may be designed to pass through the intermediate position of the giant magnetoresistive effect elements 88, 89 at a specific position during rotation of the magnetic coding member 83.

When configured as above, the circuit does not produce an accurate sine wave output whose frequency and amplitude are constant, but produces composite outputs that contain curves having different amplitudes depending on periods. Since even the composite outputs can specify the position of rotation of the magnetic coding member 83, naturally the circuit can be used for the potentiometer.

Figure 6:
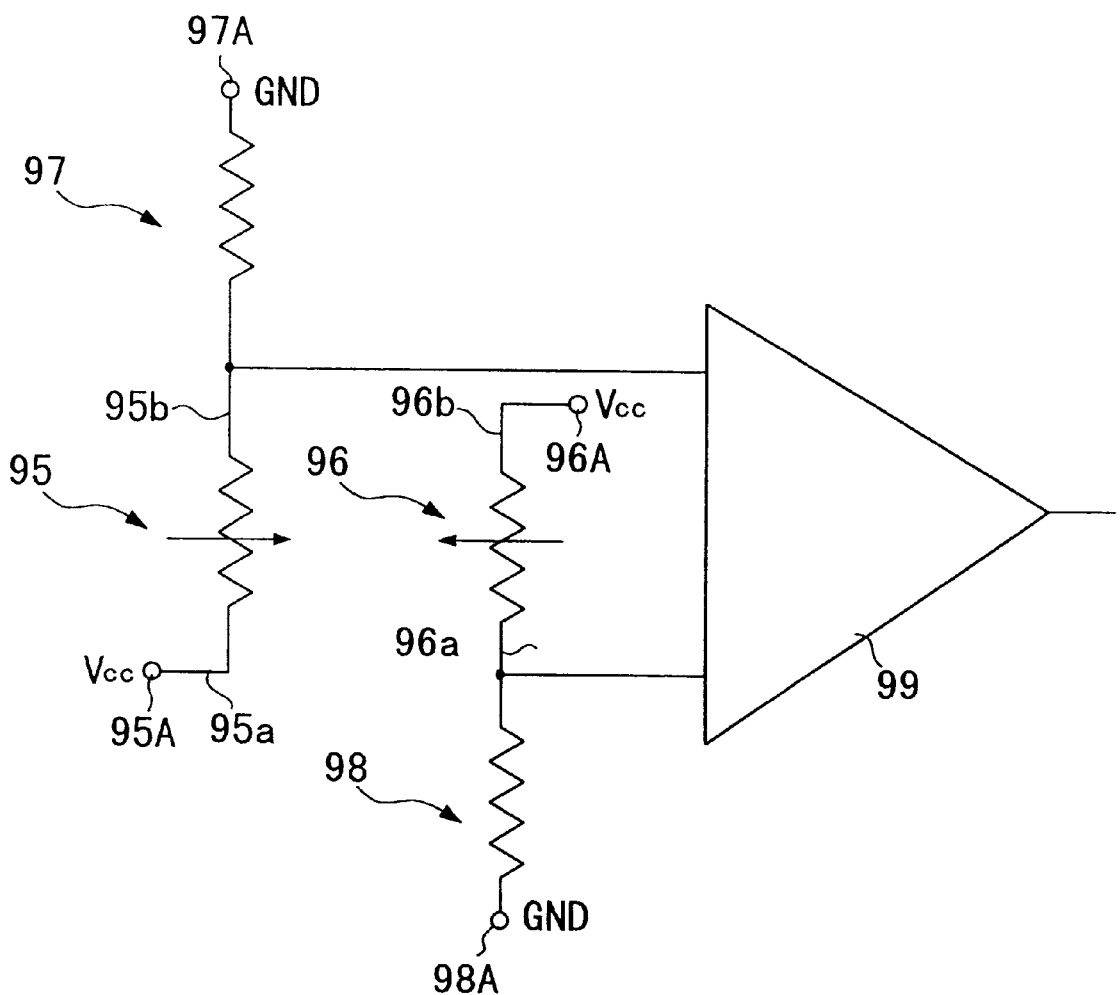
FIG. 6 is a circuit diagram to illustrate the third example of the connection structure of the giant magnetoresistive effect elements provided in the potentiometer relating to the present invention.

FIG. 6 illustrates a circuit structure of the giant magnetoresistive effect elements used for the potentiometer of the third embodiment relating to the present invention. The circuit structure comprises an input terminal 95A connected to one end 95a of the giant magnetoresistive effect element 95, a resister 97 connected to the other end 95b, a ground terminal 97A connected to the other end of the resister 97, an input terminal 96A connected to the other end 96b of the giant magnetoresistive effect element 96, a resister 98 connected to one end 96a, a ground terminal 98A connected to the other end of the resister 98, an amplifier 99 having one input connected to the intermediate (connection) point between the giant magnetoresistive effect element 95 and the resister 97, which has the other input connected to the intermediate (connection) point between the giant magnetoresistive effect element 96 and the resister 98, whereby the circuit is able to perform the differential amplification of the outputs from the above two intermediate points.

To form the circuit structure shown in FIG. 6 on the substrate K shown in FIG. 2 will constitute a potentiometer, and to apply individual voltages to each of the terminals 97A, 95A, 96A, 98A will obtain an amplified sine wave output signal according to the angle of rotation of the rotary spindle 80 from the amplifier 99. Thereby, the circuit functions as a potentiometer, and produces a sine wave output according to the rotation of the rotary spindle 80 in the same manner as the first embodiment. In this embodiment, since the amplifier 99 can amplify the output, the circuit can produce a higher output than that of the first embodiment.

Figure 7:
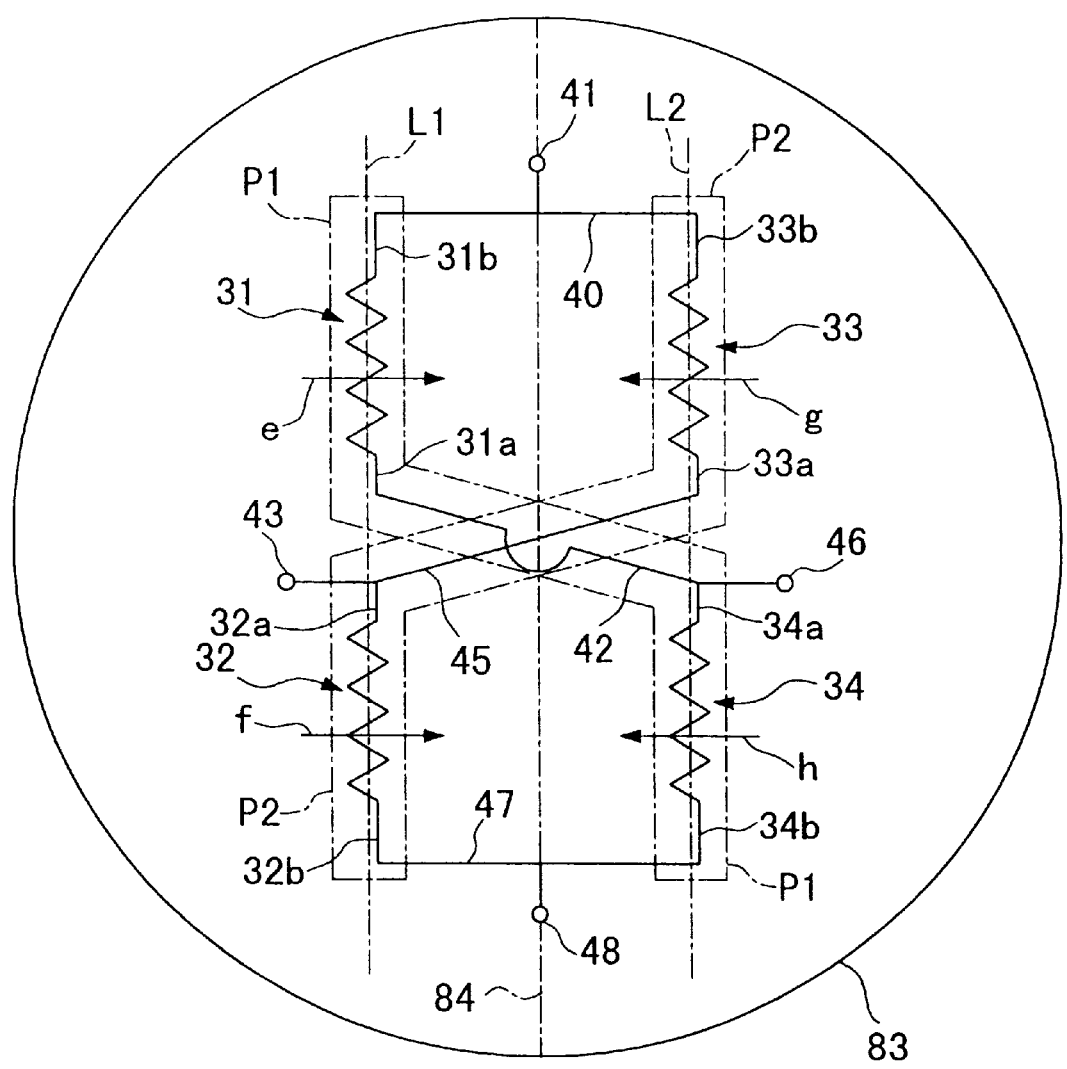
FIG. 7 is a circuit diagram to illustrate the fourth example of the connection structure of the giant magnetoresistive effect elements provided in the potentiometer relating to the present invention.
Figure 8:
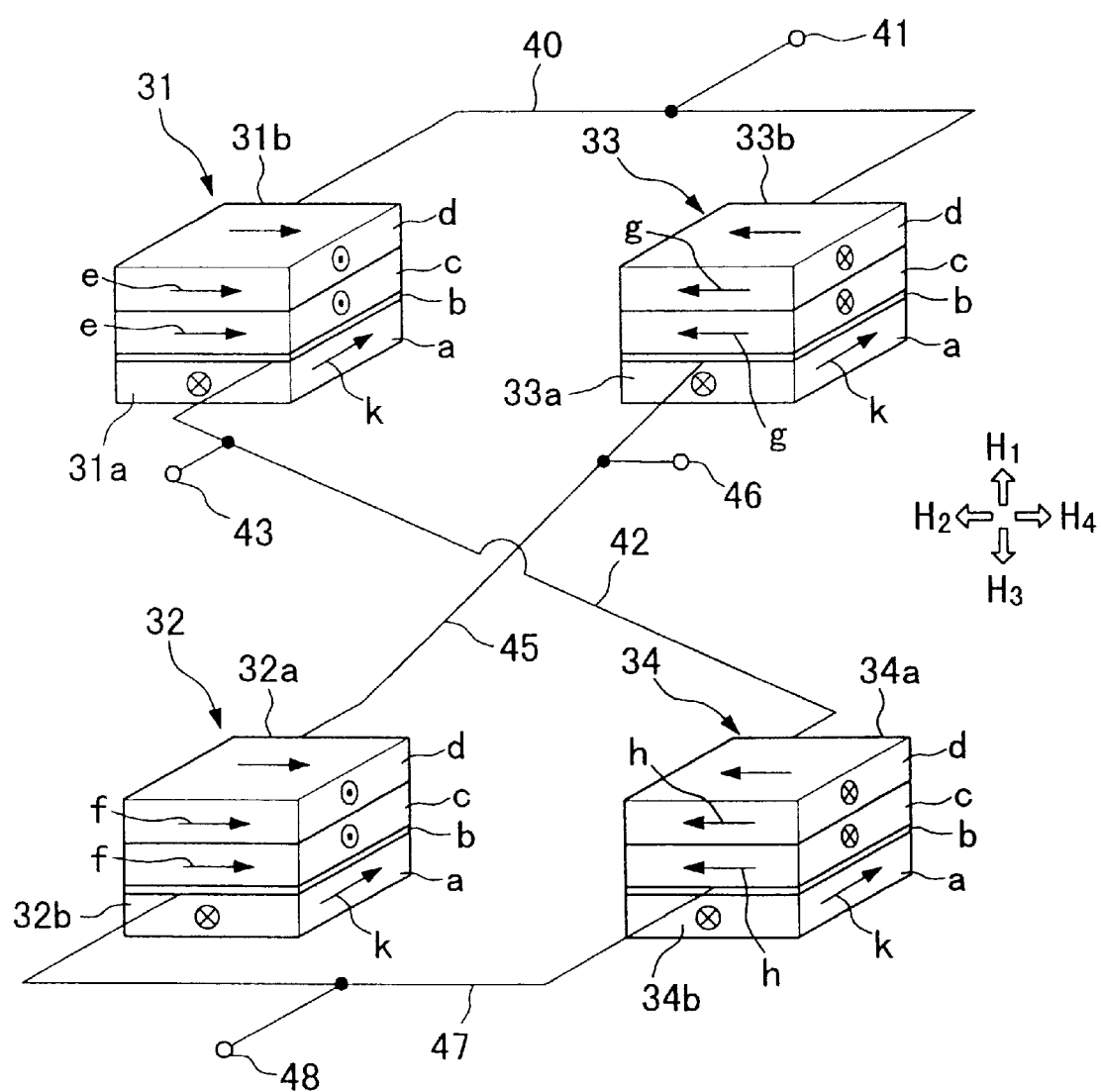
FIG. 8 is a schematic constructional chart to illustrate the basic structure and connection of these giant magnetoresistive effect elements shown in FIG. 7.
Figure 9:
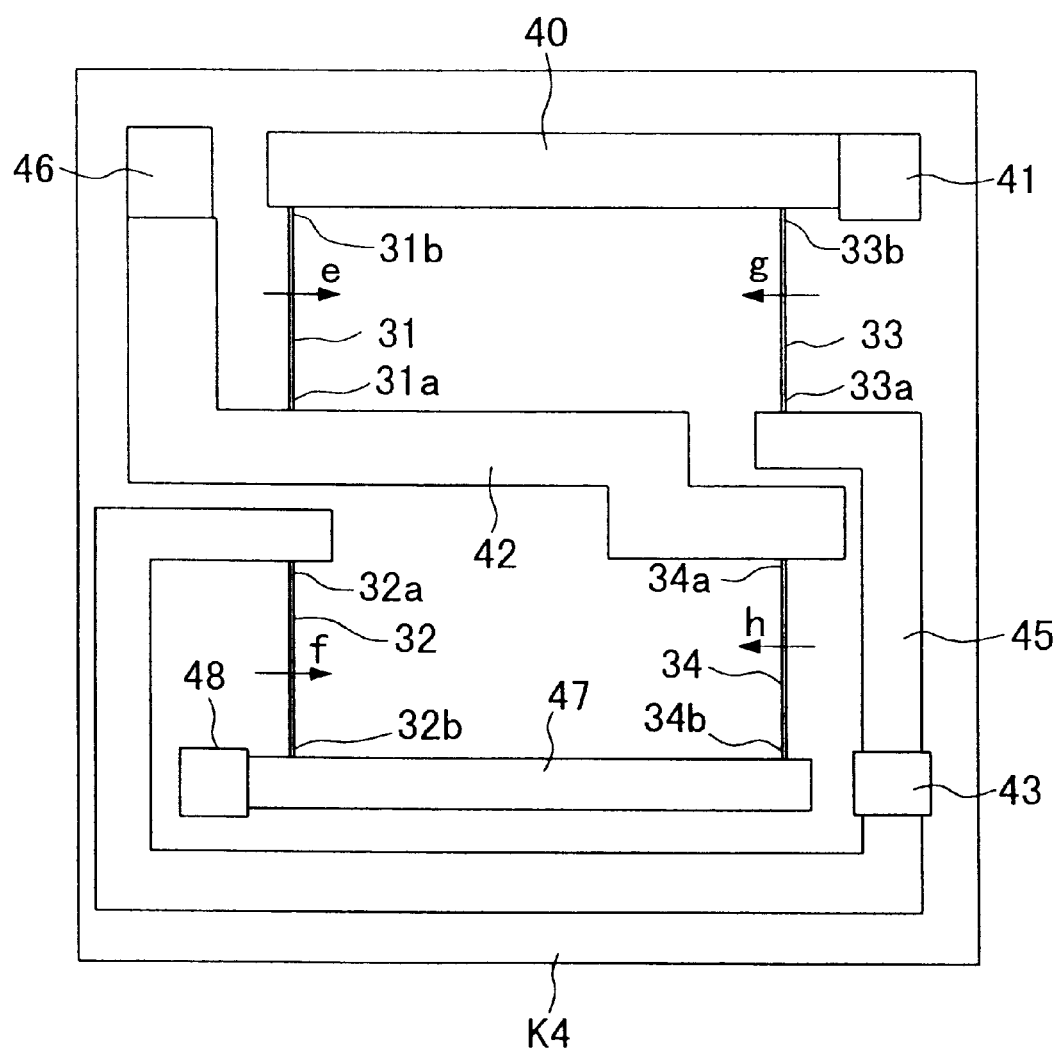
FIG. 9 is a plan view to illustrate one example in which the connection structure of the giant magnetoresistive effect elements shown in FIG. 7

FIG. 7 illustrates a circuit structure of the giant magnetoresistive effect elements used for the potentiometer of the fourth embodiment relating to the present invention, FIG. 8 is a schematic construction chart to illustrate the basic concept of the circuit, and FIG. 9 is a plan view to illustrate one example of a structure in which the giant magnetoresistive effect elements are formed on a practical substrate K4. The substrate K4 provided in the potentiometer of the fourth embodiment contains a first giant magnetoresistive effect element 31 disposed in the upper left in FIG. 7, a second giant magnetoresistive effect element 32 disposed in the lower left in FIG. 7, a third giant magnetoresistive effect element 33 disposed in the upper right in FIG. 7, and a fourth giant magnetoresistive effect element 34 disposed in the lower right in FIG. 7.

All of these giant magnetoresistive effect elements 31, 32, 33, 34 are made of a thin film laminate, as described later, and are formed in a linear slenderness. The first and second giant magnetoresistive effect elements 31, 32 are disposed along a first straight line L1 shown in FIG. 7, and the third and fourth giant magnetoresistive effect elements 33, 34 are disposed along a second straight line L2 provided in parallel to and detached from the first straight line L.

Further, the first and third giant magnetoresistive effect elements 31, 33 are disposed at right and left positions to face each other, and the second and fourth giant magnetoresistive effect elements 32, 34 are disposed at right and left positions to face each other.

In this embodiment, the first and second giant magnetoresistive effect elements 31, 32 are disposed on one straight line, and the third and fourth giant magnetoresistive effect elements 33, 34 are disposed on another straight line; however, these elements may be dislocated slightly in the longitudinal direction while the parallelism thereof is maintained, and may individually be slanted slightly.

FIG. 8 clarifies a concrete lamination structure of the giant magnetoresistive effect elements 31, 32, 33, 34 of this embodiment, and the orientations of magnetization axes of these layers, in which the giant magnetoresistive effect elements 31, 32, 33, 34 each are made equivalent in terms of structure, and each of them comprises a ferromagnetic layer (free magnetic layer) a, a non-magnetic layer b, ferromagnetic layer (pinned magnetic layer) c, and exchange bias layer (anti-ferromagnetic layer) d which are deposited in lamination, basically as shown in FIG. 8.

In the lamination structure shown in FIG. 8, in the first giant magnetoresistive effect element 31, the orientations of magnetization axes of the exchange bias layer d and the pinned magnetic layer c are set to the right as shown by the arrow e; and in the second giant magnetoresistive effect element 32, the orientations of magnetization axes of the exchange bias layer d and the pinned magnetic layer c are set to the right as shown by the arrow f.

In the third giant magnetoresistive effect element 33, the orientations of magnetization axes of the exchange bias layer d and the pinned magnetic layer c are set to the left as shown by the arrow g; and in the fourth giant magnetoresistive effect element 34, the orientations of magnetization axes of the exchange bias layer d and the pinned magnetic layer c are set to the left as shown by the arrow h. Therefore, the orientations of magnetization axes of the pinned magnetic layers c of the first and second giant magnetoresistive effect elements 31, 32 are in the same direction, and the orientations of magnetization axes of the pinned magnetic layers c of the third and fourth giant magnetoresistive effect elements 33, 34 are in the same direction. Accordingly, the orientations of magnetization axes of the pinned magnetic layers c of the first and second giant magnetoresistive effect elements 31, 32 face 180° opposite to the orientations of magnetization axes of the pinned magnetic layers c of the third and fourth giant magnetoresistive effect elements 33, 34.

The magnetization axes of the free magnetic layers a of the first, second, third, fourth giant magnetoresistive effect elements 31, 32, 33, 34 face unspecified directions while the external magnetic field is not acted.

Next, one side 31a of the first giant magnetoresistive effect element 31 is connected to one side 34a of the fourth giant magnetoresistive effect element 34 through a conductor 42, which constitutes a connection part, and an output terminal 43 is connected to the conductor 42. And, in the same manner, one side 32a of the second giant magnetoresistive effect element 32 is connected to one side 33a of the third giant magnetoresistive effect element 33 through a conductor 45, which constitutes a connection part, and an output terminal 46 is connected to the conductor 45. Further, the other side 31b of the first giant magnetoresistive effect element 31 is connected to the other side 33b of the third giant magnetoresistive effect element 33 through a conductor 40, which constitutes a connection part, and an input terminal 41 is connected to the conductor 40. And, in the same manner, the other side 32b of the second giant magnetoresistive effect element 32 is connected to the other side 34b of the fourth giant magnetoresistive effect element 34 through a conductor 47, which constitutes a connection part, and an input terminal 48 is connected to the conductor 47.

Thus, the first giant magnetoresistive effect element 31 is connected in series to the fourth giant magnetoresistive effect element 34 to form a first connection pair P1, and the second giant magnetoresistive effect element 32 is connected in series to the third giant magnetoresistive effect element 33 to form a second connection pair P2.

FIG. 9 illustrates an example of a structure in which the giant magnetoresistive effect elements 31, 32, 33, 34 of the basic structure shown in FIG. 7 and FIG. 8, the conductors 40, 42, 45, 47, and the terminals 41, 43, 46, 48 are deposited in lamination practically on the substrate K4.

In this structure, the substrate K4 is made of a nonmagnetic substance such as a Si substrate or the like. Normally, a substrate film made of $Al_2O_3$, etc., is preferably overlaid on the upper side of the substrate K4 in pursuit for flatness or improvement of insulation.

On the substrate K4 are formed the linear giant magnetoresistive effect elements 31, 32, 33, 34 basically having the lamination structure shown in FIG. 8, disposed along the straight lines L1, L2 shown in FIG. 7, the conductors 40, 42, 45, 47 made of conductive metal materials such as Cr, Cu, etc., that connect these elements, and the terminals 41, 43, 46, 48 so as to be located at the corners of the substrate K4. The detailed sectional structure of the giant magnetoresistive effect element 31 in this embodiment is equal to that of the giant magnetoresistive effect element 26 previously explained with FIG. 4.

When external magnetic fields $H_1$, $H_2$, $H_3$, $H_4$ are applied to the giant magnetoresistive effect elements 31, 32, 33, 34 shown in FIG. 7 and FIG. 8 by rotating the rotary spindle 80, the orientations of magnetization axes of the free magnetic layers a of the giant magnetoresistive effect elements 31, 32, 33, 34 each rotate in accordance with these magnetic fields $H_1$, $H_2$, $H_3$, $H_4$, which consequently produces the electric resistance variations of these elements in accordance with the angle of rotation.

The measurement of the electric resistance variations can be carried out by applying a specific voltage across the terminals 41 and terminal 48, regarding these as the input, and measuring the voltage involving the resistance variation between the terminals 43 and terminal 46, regarding these as the output.

Figure 10:
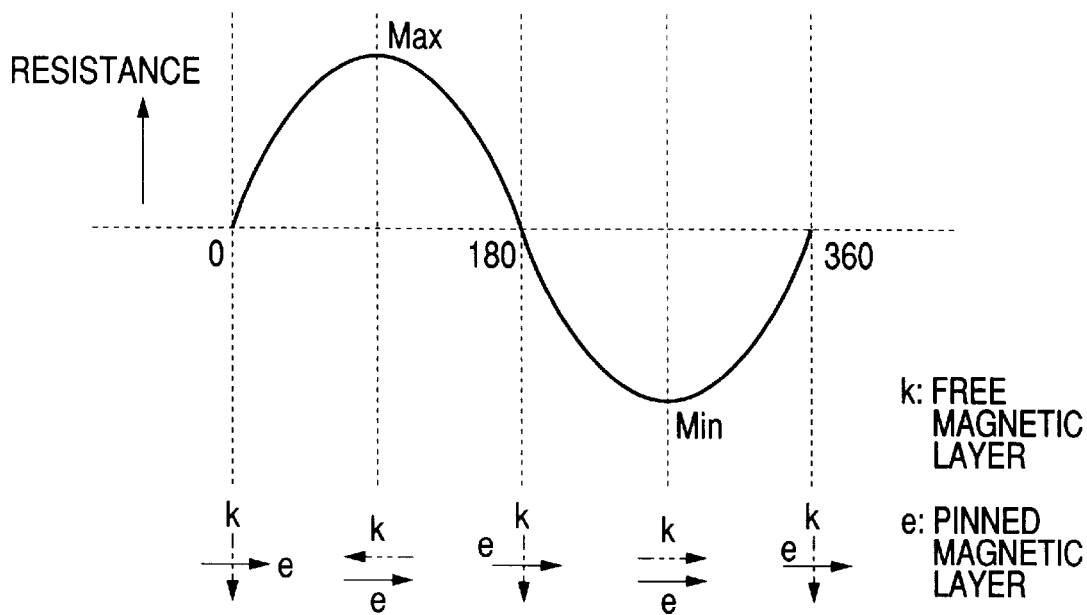
FIG. 10 is a chart to illustrate a sine wave obtained in the connection structure of the giant magnetoresistive effect elements shown in FIG. 7 and FIG. 8.

FIG. 10 illustrates, in the potentiometer of the foregoing structure, the resistance variation in accordance with the rotation of the magnetization axis of the free magnetic layer a, when fixing the orientations e of magnetization axes of the pinned magnetic layers c in one (right) direction. The resistance variation shows the minimum value when the orientation e of magnetization axis of the pinned magnetic layer c and the orientation k of magnetization axis of the free magnetic layer a face the same direction, shows the maximum value when both two face the opposite (antiparallel) directions, and it shows intermediate values given by the sine wave as shown in FIG. 10.

These resistance variations result from the characteristic that, when a magnetic field more than the saturation level is applied to the giant magnetoresistive effect elements 31, 32, 33, 34, the resistance values of these elements become constant, regardless of the magnetic field strength, according to an angle formed by the orientations of magnetization axes of the pinned magnetic layer c and the free magnetic layer a, in which the value takes the maximum when both the orientations face opposite, the value decreases as they face slant, and the value takes the minimum when they face to the same direction.

Therefore, regarding the intermediate point of the resistance variation as the origin thereof, the polarity of the resistance variation (assuming the increasing direction as positive, the decreasing direction as negative) is identical between the giant magnetoresistive effect elements 31, 32 whose orientations of magnetization axes of the pinned magnetic layers c are made the same, and is identical between the giant magnetoresistive effect elements 33, 34; however, the polarity is reverse between the giant magnetoresistive effect element 31 and the giant magnetoresistive effect element 33, and is reverse between the giant magnetoresistive effect element 32 and the giant magnetoresistive effect element 34. Therefore, the connection structure shown in FIG. 7 and FIG. 8 can be said to form the Wheatstone bridge of the giant magnetoresistive effect elements, which effectively operates as a potentiometer. As compared to the former embodiments provided with two giant magnetoresistive effect elements, the structure of this embodiment with the giant magnetoresistive effect elements 31, 32, 33, 34 forming the Wheatstone bridge can produce a higher output (increase of resistance variation rate) and canceling effect on magnetic noise components due to environmental change of magnetic fields (elimination of noise components of each giant magnetoresistive effect element due to the direction of geomagnetism and the magnetic noise components, etc.).

Figure 11:
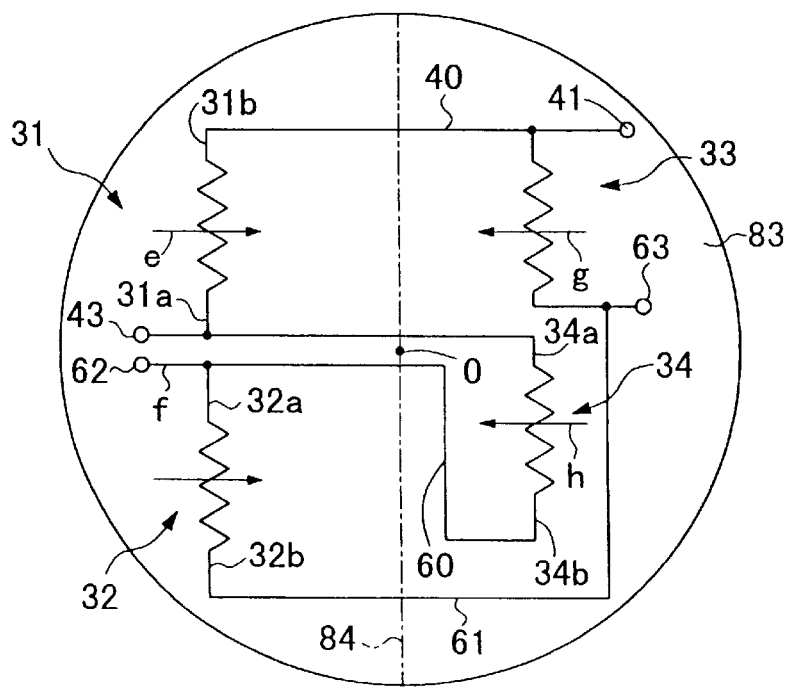
FIG. 11 is a circuit diagram to illustrate the fifth example of the connection structure of the giant magnetoresistive effect elements provided in the potentiometer relating to the present invention.
Figure 12:
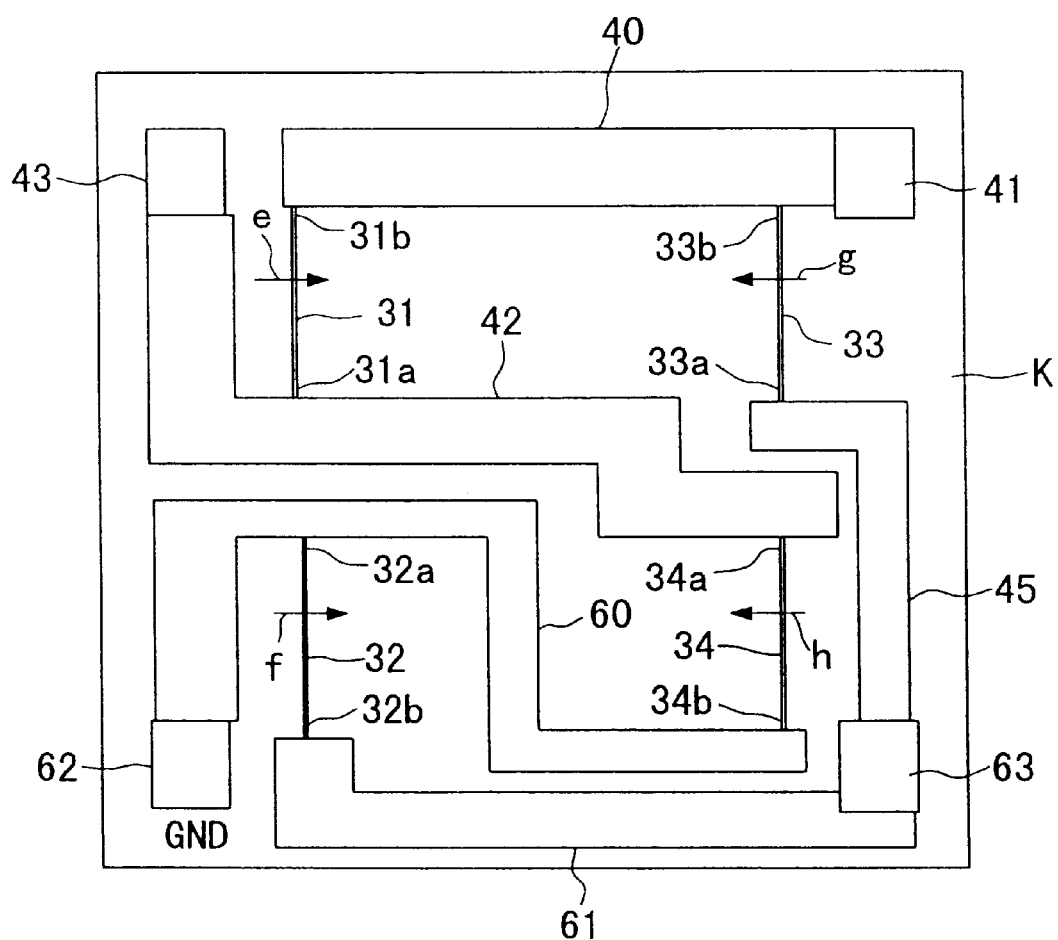
FIG. 12 is a plan view to illustrate one example in which the connection structure of the giant magnetoresistive effect elements shown in FIG. 11 is formed on a substrate.

FIG. 11 and FIG. 12 illustrate a construction of the giant magnetoresistive effect elements for use in the potentiometer relating to the present invention. In the construction of this embodiment, the same constitutional components as those in FIG. 7 and FIG. 9 are given the same symbols to omit the descriptions of them.

Also in the potentiometer provided with the giant magnetoresistive effect elements of this connection structure, in the same manner as the potentiometer of the former embodiments, the giant magnetoresistive effect elements 31, 32, 33, 34 are formed on a substrate K5, and the orientations of magnetization axes of these pinned magnetic layers are equal, however the connection structure by a conductor is different only in part.

The other end 31b of the first giant magnetoresistive effect element 31 is connected to the other end 33b of the third giant magnetoresistive effect element 33 through the conductor 40, in the same manner as in the structure of FIG. 7 and FIG. 9; similarly the end 31a of the first giant magnetoresistive effect element 31 is connected to the end 34a of the fourth giant magnetoresistive effect element 34 through the conductor 42. Further, the end 32a of the second giant magnetoresistive effect element 32 is connected to the other end 34b of the fourth giant magnetoresistive effect element 34 through the conductor 60, and the other end 32b of the second giant magnetoresistive effect element 32 is connected to the end 33a of the third giant magnetoresistive effect element 33 through the conductor 61. And, a part of the conductor 60 is extended to the corner part of the substrate K5 to form an input terminal 62 (ground) and an output terminal 63 at the corner part of the substrate K5 on the halfway of the conductor 61.

Also in the potentiometer employing the connection structure of the giant magnetoresistive effect elements as shown in FIG. 11 and FIG. 12, since the giant magnetoresistive effect elements 31, 32, 33, 34 form the Wheatstone bridge, the circuit connection will attain the sine wave output in accordance with the angle of rotation of the rotary spindle 80 in the same manner as the structure of the former embodiments, and it can be used as the potentiometer.

Next, the method of pinning the magnetization axes of each of the pinned magnetic layers c in the giant magnetoresistive effect elements 31, 32, 33, 34 of the structure shown in FIG. 12 will now be described.

To manufacture the substrate K5 shown in FIG. 12, a required film is deposited on a silicon substrate or the like, the photolithography processes are conducted appropriately in accordance the lamination processes of films as needed, and the patterning is applied thereon.

First, a required thin film is deposited on the substrate in accordance with the lamination structure of the desired giant magnetoresistive effect elements. When the giant magnetoresistive effect element is a five layered structure, five thin films are deposited; when a six layered structure, six thin films are deposited; and when a seven layered structure, seven thin films are deposited.

Next, a photo resist is applied on the deposited films and the photolithography process is carried out to leave only a necessary part as the linear giant magnetoresistive effect elements.

Next, after the resist film is formed on these giant magnetoresistive effect elements, an electrode film is formed, thereafter the electrode film is formed into a desired shape by the photolithography process to form conductor patterns as shown in FIG. 12, and then to carry out the magnetic field application as described later will fabricate the substrate K5 provided with the circuit shown in FIG. 12.

Figure 13:
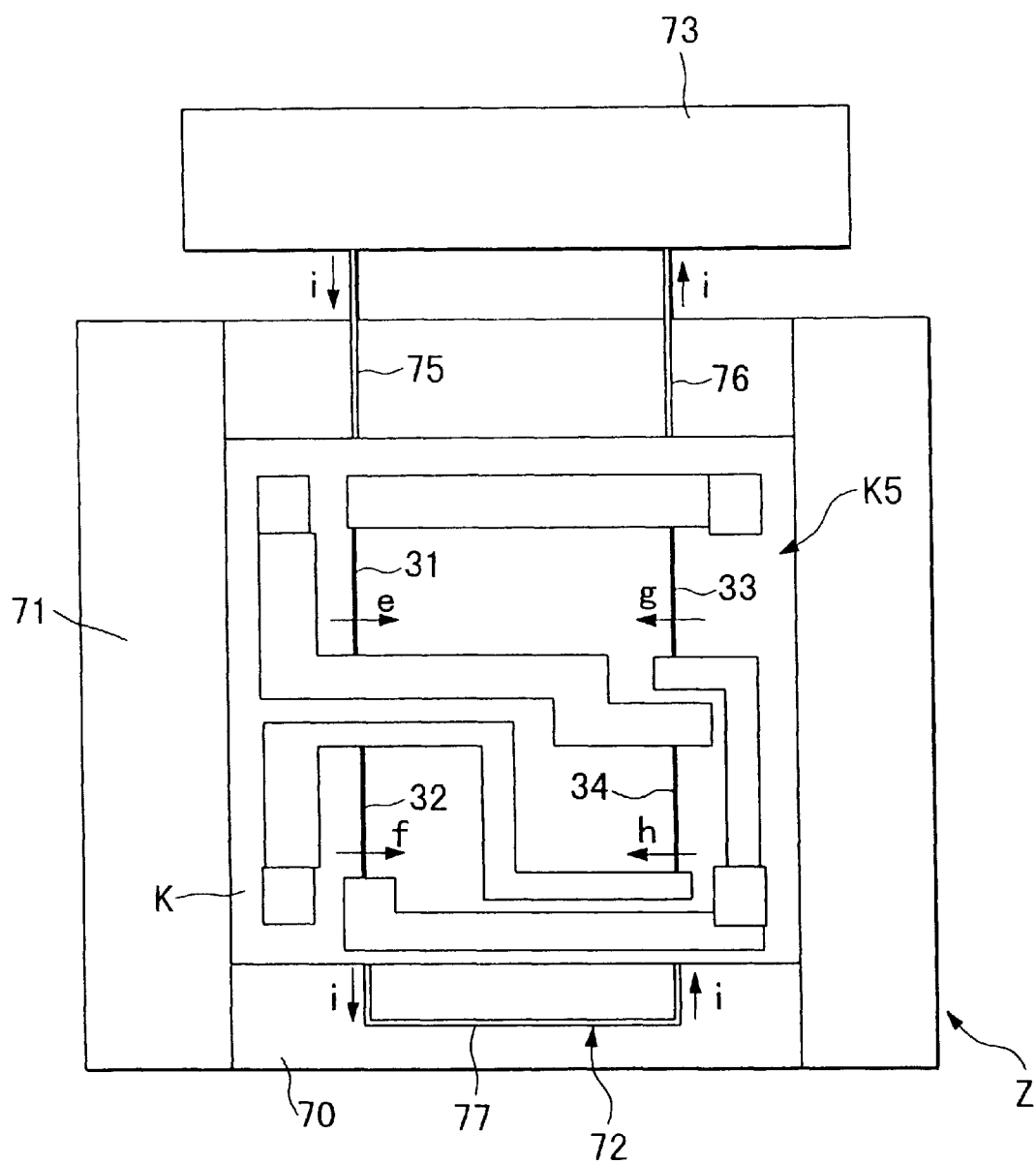
FIG. 13 is a chart to illustrate a state in which the giant magnetoresistive effect elements shown in FIG. 11 are polarized by a manufacturing apparatus.
Figure 14:
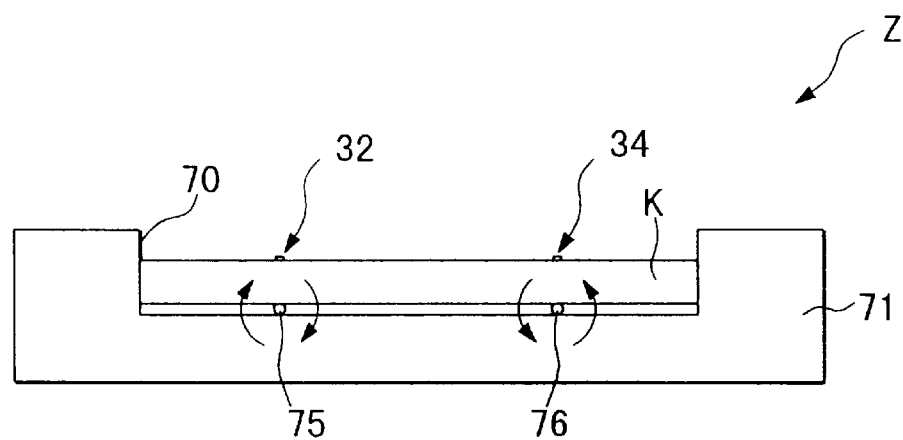
FIG. 14 is a side view of the foregoing state.

When carrying out the magnetic field application, a manufacturing apparatus Z shown in FIG. 13, FIG. 14 is employed. This manufacturing apparatus Z mainly comprises a base 71 provided with a recessed portion 70 having a width such that the substrate K5 for the potentiometer can be seated therein, a loop type conductor 72 installed on the bottom of this recessed portion 70, and a power supply 73 connected to the conductor 72. The conductor 72 is comprised of a linear first conductor 75, a linear second conductor 76 parallel to the first conductor 75, a connection conductor 77 that connects the first conductor 75 to the second 76, which form a loop.

And, when embedding the substrate K in the recessed portion 70, the manufacturing apparatus Z is made such that, as shown in FIG. 14, the giant magnetoresistive effect elements 31, 32 are positioned above the first conductor 75, and the giant magnetoresistive effect elements 33, 34 are positioned above the second conductor 76. And, the power supply 73 is one that a direct current can be supplied from the first conductor 75 toward the second conductor 76.

When supplying a direct current from the power supply 73, after embedding the substrate K5 in the recessed portion 70, a current running through the conductor 75 generates a clockwise magnetic field regarding the conductor 75 shown in FIG. 14 as the center, and a current running through the conductor 76 generates an anti-clockwise magnetic field regarding the conductor 76 as the center. Accordingly, the exchange bias layers d of the first and second giant magnetoresistive effect elements 31, 32 can be polarized in the directions shown by the arrows e, f in FIG. 13, and the exchange bias layers d of the third and fourth giant magnetoresistive effect elements 33, 34 can be polarized in the directions shown by the arrows g, h in FIG. 13; and the exchange coupling forces of the exchange bias layers d are able to pin the individual orientations of magnetization axes of the pinned magnetic layers c adjacent to these exchange bias layers d in the individual directions (e direction, f direction, g direction, h direction). Since stopping the current supply to the conductor 77 after polarizing will maintain the polarized state of the exchange bias layers d as it is, the orientations of magnetization axes of the pinned magnetic layers c are also maintained as pinned.

By completing all these processes can be obtained the substrate K5 for the potentiometer in which the orientations of magnetization axes of the pinned magnetic layers each are controlled as shown in FIG. 13.

When flowing currents through the first conductor 75 and the second conductor 76 to generate magnetic fields, if the currents running through both the conductors act with the time discrepancy of 100 $\mu$sec only, there is a possibility that the polarized state of the exchange bias layers d of the first and second giant magnetoresistive effect elements 31, 32 is not equal to the polarized state of the exchange bias layers d of the third and fourth giant magnetoresistive effect elements 33, 34. Therefore, it is very important to connect the first conductor 75 and the second conductor 76 to one and the same power supply and generate the magnetic fields in a state that the time discrepancy in applying the magnetic fields is eliminated as much as possible.

However, if the two conductors can be polarized using two power supplies that are synchronized so as to eliminate the time discrepancy in applying the magnetic fields, the two separate power supplies may flow the currents through the first conductor 75 and the second conductor 76.

Incidentally, when the exchange bias layers d are made of $\alpha$-$Fe_2O_3$, NiO, IrMn, CrPtMn, the exchange bias layers d can be polarized instantly by such magnetic field application means. However, when NiMn, PdPtMn, MnRhRu, and PtMn are selected as the constructional materials of the exchange bias layers d, since the exchange bias layers d are needed to be polarized as mentioned above after being heated to a higher temperature than the blocking temperature, polarizing work becomes complicated, however naturally these materials can be applied to the present invention.

Figure 15:
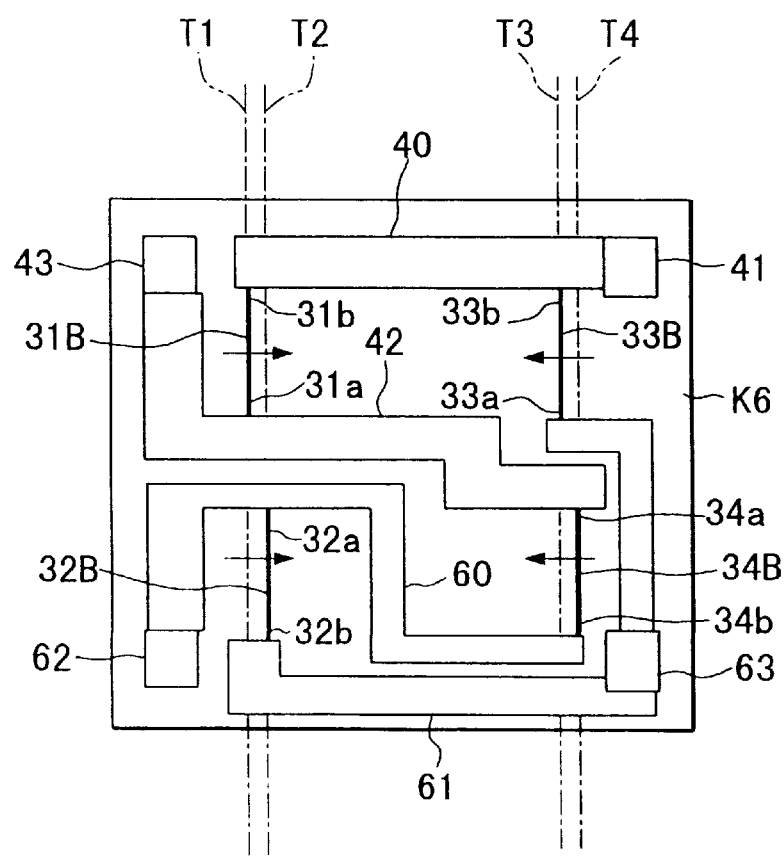
FIG. 15 is a circuit diagram to illustrate the sixth example of the connection structure of the giant magnetoresistive effect elements provided in the potentiometer relating to the present invention.

FIG. 15 illustrates the other embodiment of a substrate for the potentiometer relating to the present invention. A substrate K6 in this embodiment is basically equal to the substrate K5 shown in FIG. 12, as to the basic structure. The difference is that the first giant magnetoresistive effect element 31B is formed along the first straight line T1, and the second giant magnetoresistive effect element 32B is formed along the second straight line T2, and that the third giant magnetoresistive effect element 33B is formed along the third straight line T3, and the fourth giant magnetoresistive effect element 34B is formed along the fourth straight line T4. All of the first, second, third, and fourth straight lines T1, T2, T3, T4 are parallel, and the straight line T1 is disposed adjacently to the straight line T2 and the straight line T3 is disposed adjacently to the straight line T4.

The other structure is equal to the substrate K5 in FIG. 12, and the potentiometer incorporating the substrate K6 in this embodiment can also achieve the same effect as that in the foregoing embodiments.

The manufacturing apparatus Z shown in FIG. 13, FIG. 14 cannot be employed as it is, for manufacturing the substrate K6. To utilize the apparatus Z, it is necessary to deform to bend the first conductor 75 to coincide with the position of the first giant magnetoresistive effect element 31B and the position of the second giant magnetoresistive effect element 32B, and to deform to bend the second conductor 76 to coincide with the position of the third giant magnetoresistive effect element 33B and the position of the fourth giant magnetoresistive effect element 34B.

Concretely, as to the first conductor 75, it is preferable to form a bent portion between a straight line portion close to the power supply 73 and a straight line portion detached from the power supply 73 (below an intermediate portion between the first giant magnetoresistive effect element 31B and the second giant magnetoresistive effect element 32B), and design so as to be able to align the first conductor 75 with either of the first giant magnetoresistive effect element 31B and the second giant magnetoresistive effect element 32B. And, as to the second conductor 76, similarly to the first conductor 75, it is preferable to form the bent portion below the intermediate portion between the third giant magnetoresistive effect element 33B and the fourth giant magnetoresistive effect element 34B, and design so as to be able to align the second conductor 76 with either of the third giant magnetoresistive effect element 33B and the fourth giant magnetoresistive effect element 34B.

As in the foregoing embodiments, assuming that the four giant magnetoresistive effect elements form a bridge circuit, it is preferable to dispose the first and second giant magnetoresistive effect elements on one straight line, and the third and fourth giant magnetoresistive effect elements on another straight line; however, they may be disposed in a slightly dislocated state as the embodiment shown in FIG. 15. Further, any of the giant magnetoresistive effect elements are not needed to be disposed completely in parallel, and naturally they may be disposed slant to the extent that it does not bring about all difficulties in detecting the resistances whose phases are different when the bridge circuit is formed.

EXAMPLE

A substrate of the basic structure was formed in such a manner that four linear giant magnetoresistive effect elements of 0.05 mm wide and 1.75 mm long were formed on a silicon substrate of 3.6 mm long, 3.6 mm wide, and 0.5 mm thick, to be disposed in parallel each other as shown in FIG. 12.

Each of the giant magnetoresistive effect elements on the substrate was formed in an eight-layered lamination structure of $Al_2O_3$ layer (1000 Å thick)/$\alpha$-$Fe_2O_3$ layer (1000 Å thick)/NiFe layer (30 Å thick)/Co layer (10 Å thick)/Cu layer (22 Å thick)/Co layer (10 Å thick)/NiFe layer (77 Å thick)/Ta layer (30 Å thick). The conductors to connect the end parts of the giant magnetoresistive effect elements were formed of Cr films, which were connected as shown in FIG. 12.

Next, the substrate was set in the manufacturing apparatus Z shown in FIG. 13 and FIG. 14, and a direct current of 3500 Å was flown from one and the same power supply for 100 $\mu$sec through the first and second conductors made of a copper wire having the thickness of 0.8 mm–0.9 mm to polarize the exchange bias layers; thus obtaining the giant magnetoresistive effect elements.

This substrate was incorporated into the potentiometer of the structure shown in FIG. 2. A disc-form magnetic coding member was disposed with a gap of 1 mm from the surface of the substrate. The substrate was fixed by aligning the central position of the four giant magnetoresistive effect elements on the substrate to the position of the central axis of the magnetic coding member. 5 volts were applied to the input terminal of the substrate to measure the voltage on the output terminal, and turning the magnetic coding member about the axis obtained the output voltage variations as shown by the sine curve in FIG. 16, which confirmed that this construction could be used as a potentiometer.

Figure 16:
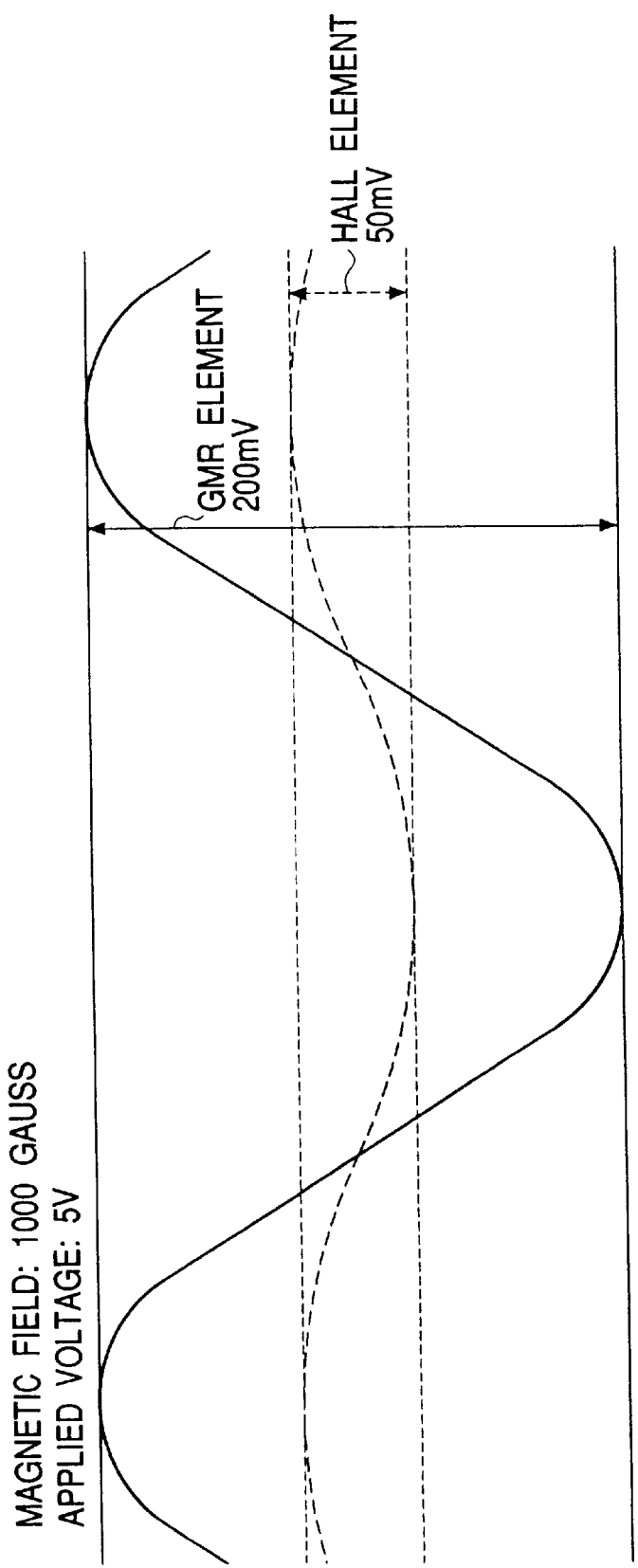
FIG. 16 is a chart to illustrate a measurement result of the output voltage obtained by the potentiometer of a test example.
Figure 17:
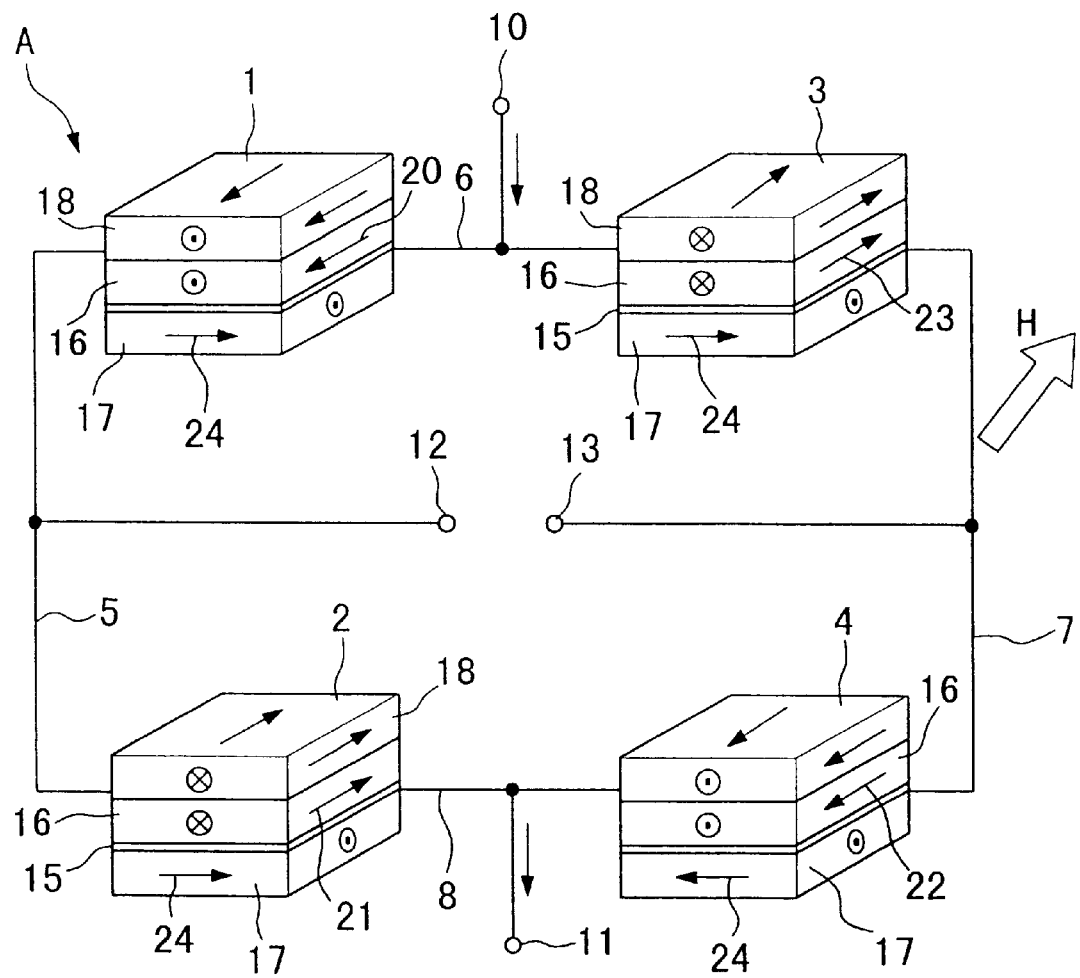
FIG. 17 is a schematic constructional chart to illustrate one example of a conventional magnetic sensor.
Figure 18:
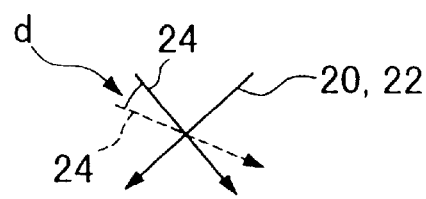
FIG. 18 is a chart to illustrate the relation of the orientations of magnetization axes of the pinned magnetic layers to those of the free magnetic layers in the giant magnetoresistive effect elements provided in the conventional magnetic sensor shown in FIG. 17.

In contrast to this, instead of the substrate shown in FIG. 2, the same test was made with a potentiometer using Hall elements of GaAs system semiconductors, which obtained the output voltage at maximum amplitude 50 mV shown by the dotted line in FIG. 16.

The comparison of these examples found that the potentiometer in the example relating to the present invention gained a sign wave with the voltage variation of 200 mV virtually four times higher than the potentiometer using the Hall elements, and enhanced the sensitivity.

As described above, in the potentiometer of the present invention, at least a pair of giant magnetoresistive effect elements containing the pinned magnetic layers whose orientations of magnetization axes face 180° opposite are formed on a substrate, and a magnetic coding member having the poles is rotatably disposed so as to face these giant magnetoresistive effect elements. Therefore, the rotation of the magnetic coding member can be detected by measuring the voltage variation of the center point of the pair of the giant magnetoresistive effect elements in accordance with the angle of rotation of the magnetic coding member, and this circuit structure can be used as a potentiometer.

And, using the giant magnetoresistive effect elements, the structure is capable of acquiring a large resistance variation.

Further, a precise sine wave output can be obtained by aligning the center position between the giant magnetoresistive effect elements to be paired with the position of the rotational axis of the magnetic coding member, which facilitates the analysis of the obtained output data.

Further, the circuit structure that forms the Wheatstone bridge by four giant magnetoresistive effect elements can easily increase the output voltage variation, and can easily cancel noise magnetic fields when environmental noise magnetic fields act thereon, which makes it possible to provide a potentiometer capable of detecting a precise angle of rotation.

Further, the circuit structure that disposes the first and second giant magnetoresistive effect elements along the first straight line, and the third and fourth giant magnetoresistive effect elements along the second straight line, and forms the Wheatstone bridge by mutually connecting these four elements can easily increase the output voltage variation, and can easily cancel noise magnetic fields when environmental noise magnetic fields act thereon, which makes it possible to provide a potentiometer capable of detecting a precise angle of rotation.

In addition to this, the circuit structure makes it possible to polarize the exchange bias layers of the first and second giant magnetoresistive effect elements in the same direction at one time all together, and to polarize the exchange bias layers of the third and fourth giant magnetoresistive effect elements in the same direction at one time all together.

Therefore, the structure makes the polarization work in production remarkably easy compared to the conventional structure that requires polarization in four different directions. Therefore, the present invention will provide a potentiometer having the giant magnetoresistive effect elements connected in a bridge circuit, which shows very high productivity.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A potentiometer comprising a plurality of giant magnetoresistive effect elements that contain exchange bias layers, pinned magnetic layers whose orientations of magnetization axes are fixed in one direction by the exchange bias layers, non-magnetic layers, and free magnetic layers whose orientations of magnetization axes are freely rotated by an external magnetic field;

said plurality of giant magnetoresistive effect elements formed on a substrate, said elements electrically connected with each other such that a differential output from said elements is obtained; and a rotatable magnetic coding member disposed opposite to the giant magnetoresistive effect elements on said substrate, said magnetic coding member disposed such that a line passes through an intermediate position of the giant magnetoresistive effect elements, said line extending from a neutral point of said magnetic coding member and parallel to a central axis of rotation of said magnetic coding member wherein, of the plurality of giant magnetoresistive effect elements, first and second giant magnetoresistive effect elements are disposed along a first straight line, each of the first and second giant magnetoresistive effect elements having the orientation of magnetization of the pinned magnetic layer magnetized in a predetermined orientation orthogonal to the first straight line, third and fourth giant magnetoresistive effect elements are disposed along a second straight line parallel with the first straight line, each of the third and fourth giant magnetoresistive effect elements having the orientation of magnetization of the pinned magnetic layer magnetized in an orientation 180 degrees opposite from the predetermined orientation, and the first, second, third and fourth giant magnetoresistive effect elements are sequentially connected to form a Wheatstone bridge.

2. A potentiometer according to claim 1, wherein the neutral point of the Wheatstone bridge coincides with the central axis of rotation of the magnetic coding member.

3. A potentiometer provided with giant magnetoresistive effect elements according to claim 1, wherein input terminals are formed on two of connecting points among said first, second, third, and fourth giant magnetoresistive effect elements, and output terminals are formed on the remaining two thereof.

4. A potentiometer according to claim 2, wherein the giant magnetoresistive effect elements are linear and formed in positions of point symmetry with respect to the central axis of rotation of the magnetic coding member.

* * * * *